(12) United States Patent
Baker (10) Patent No.: US 11,354,578 B2
(45) Date of Patent: Jun. 7, 2022

(54) MIXTURE OF GENERATORS MODEL

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/646,092

(22) PCT Filed: Sep. 14, 2018

(86) PCT No.: PCT/US2018/051069
§ 371 (c)(1),
(2) Date: Mar. 10, 2020

(87) PCT Pub. No.: WO2019/067236
PCT Pub. Date: Apr. 4, 2019

(65) Prior Publication Data
US 2020/0279165 A1    Sep. 3, 2020

Related U.S. Application Data (60) Provisional application No. 62/564,754, filed on Sep. 28, 2017.

(51) Int. Cl.
*G06N 3/08* (2006.01)
*G06N 3/04* (2006.01)
(Continued)

(52) U.S. Cl.
CPC ........... *G06N 3/088* (2013.01); *G06K 9/6267* (2013.01); *G06N 3/04* (2013.01); *G06N 3/0445* (2013.01);
(Continued)

(58) Field of Classification Search
CPC .............................. G06N 99/00; G06K 9/6278
(Continued)

(56) References Cited

U.S. PATENT DOCUMENTS 6,324,532 B1 * 11/2001 Spence ................ G06K 9/3241
706/27
8,484,022 B1 * 7/2013 Vanhoucke ......... G10L 19/0018
704/240

(Continued)

FOREIGN PATENT DOCUMENTS

WO        2019067236 A1    4/2019

OTHER PUBLICATIONS

'Elements of artificial neural networks': Mehrotra, MIT press, 1997.*

(Continued)

*Primary Examiner* — Li B. Zhen
*Assistant Examiner* — Peter D Coughlan
(74) *Attorney, Agent, or Firm* — K&L Gates LLP (57) ABSTRACT

Computer systems and computer-implemented methods train and/or operate, once trained, a machine-learning system that comprises a plurality of generator-detector pairs. The machine-learning computer system comprises a set of processor cores and computer memory that stores software. When executed by the set of processor cores, the software causes the set of processor cores to implement a plurality of generator-detector pairs, in which: (i) each generator-detector pair comprises a machine-learning data generator and a machine-learning data detector; and (ii) each generator-detector pair is for a corresponding cluster of data examples respectively, such that, for each generator-detector pair, the generator is for generating data examples in the corresponding cluster and the detector is for detecting whether data examples are within the corresponding cluster.

16 Claims, 5 Drawing Sheets

(51) Int. Cl.
- *G06N 20/00* (2019.01)
- *G06N 7/00* (2006.01)
- *G06K 9/62* (2022.01)
- *G06N 3/063* (2006.01)
- *G06F 17/18* (2006.01)
- *G06F 12/0815* (2016.01)

(52) U.S. Cl.
CPC ......... *G06N 3/0454* (2013.01); *G06N 3/0472* (2013.01); *G06N 3/063* (2013.01); *G06N 3/084* (2013.01); *G06N 7/005* (2013.01); *G06N 20/00* (2019.01); *G06F 12/0815* (2013.01); *G06F 17/18* (2013.01); *G06N 3/0481* (2013.01)

(58) Field of Classification Search
USPC .......................................................... 706/6
See application file for complete search history.

(56) References Cited

U.S. PATENT DOCUMENTS

| | | | | |
|---|---|---|---|---|
| 9,516,053 B1* | 12/2016 | Muddu | ............... | H04L 63/1433 |
| 2007/0289013 A1* | 12/2007 | Lim | ................... | H04L 63/1425 |
| | | | | 726/22 |
| 2011/0093249 A1* | 4/2011 | Holmes | .................. | G16H 50/70 |
| | | | | 703/6 |
| 2016/0155049 A1 | 6/2016 | Choi | | |
| 2017/0024642 A1 | 1/2017 | Xiong et al. | | |
| 2017/0109881 A1* | 4/2017 | Avendi | .................... | G06T 7/149 |
| 2017/0161635 A1* | 6/2017 | Oono | .................... | G06N 7/005 |
| 2017/0220949 A1* | 8/2017 | Feng | ....................... | H04L 41/16 |

OTHER PUBLICATIONS

International Search Report and Written Opinion for International PCT Application No. PCT/US2018/051069 dated Jan. 8, 2019.

Bao et al., "CVAE-GAN: Fine-Grained Image Generation through Asymmetric Training", ARXIV.ORG, Corell University Library 201 Olin Library Cornell University, Ithaca, NY 14853. Mar. 29, 2017, pp. 1-15.

Owhadi-Kareshk et al., "Representation Learning by Denoising Autoencoders for Clustering-based Classification". 2015 5th International Conference on Computer and Knowledge Engineering (ICCKE), Oct. 29, 2015, pp. 228-233.

Extended European Search Report for European Application No. 18861571.0 dated May 21, 2021. 7 pages.

* cited by examiner

MIXTURE OF GENERATORS MODEL

PRIORITY CLAIM

The present application is a national stage application under 35 U.S.C. § 371 of PCT application Serial No. PCT/US2018/051069, filed Sep. 14, 2018, which claims priority to U.S. provisional patent application Ser. No. 62/564,754, entitled "Aggressive Development with Cooperative Generators," filed Sep. 28, 2017, which is incorporated herein by reference in its entirety.

BACKGROUND

Machine learning is a process implemented by computers to learn models that can make predictions on data through building models from sample data inputs. There are many types of machine learning systems, such as artificial neural networks (ANNs), decision trees, support vector machines (SVMs), and others. These systems first have to be trained on some of the sample inputs before making meaningful predictions with new data. For example, an ANN typically consists of multiple layers of neurons. Each neuron is connected with many others, and links can be enforcing or inhibitory in their effect on the activation state of connected neurons. Each individual neural unit may have a summation function which combines the values of all its inputs together. There may be a threshold function or limiting function on each connection and on the neuron itself, such that the signal must surpass the limit before propagating to other neurons. The weight for each respective input to a node can be trained by back propagation of the partial derivative of an error cost function, with the estimates being accumulated over the training data samples. A large, complex ANN can have millions of connections between nodes, and the weight for each connection has to be learned.

Training a complex machine learning system typically uses a large quantity of labeled or unlabeled data. Training data for a machine learning system designed to perform a classification task comprises representative sample data for each possible category. Data within a category may be heterogeneous as a single category may comprise one or more clusters of data, where each cluster is distinct in one or more ways. Generated data that is representative of the categories and clusters is useful in training a machine learning system in a classification task.

SUMMARY

The current invention comprises a machine learning system and method of training the machine learning system that comprises one or more generator-detector pairs to model data categories as a mixture of clusters. The system can operate as a generator, as a cluster classifier or as a category classifier.

FIGURES

Various embodiments of the present invention are described herein by way of example in connection with the following figures, wherein.

DETAILED DESCRIPTION

Figure 1:
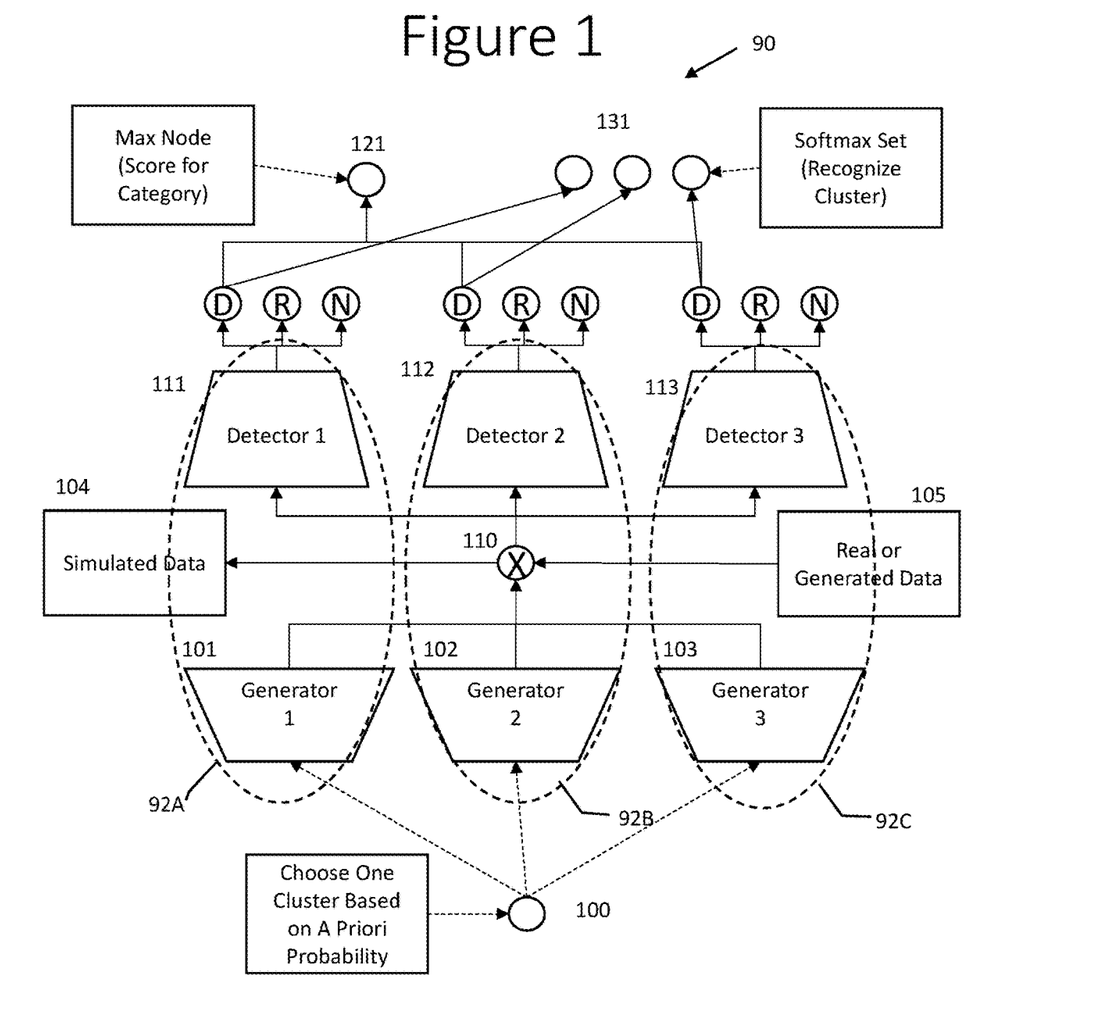
FIG. 1 illustrates a block diagram of a mixture of generators model, according to one aspect of this disclosure.
Figure 2:
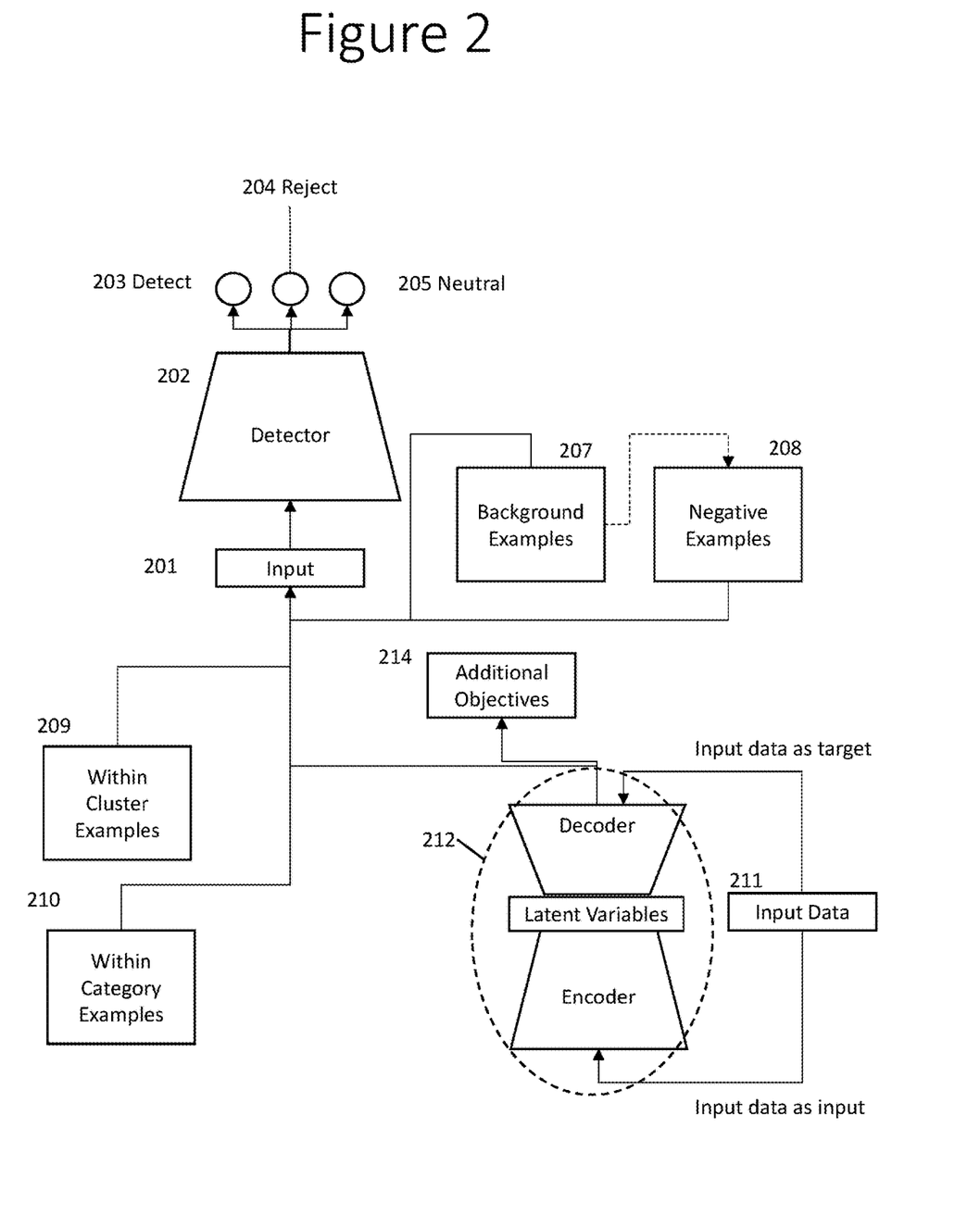
FIG. 2 illustrates a block diagram of a system for a mixture of generators model, according to one aspect of this disclosure.

FIG. 1 illustrates a system 90 according to various embodiments of the present invention. The illustrated system 90 comprises multiple generator-detector pairs. In the example embodiment shown in FIG. 1, there are three such generator-detector pairs 92A-C, although different embodiments may include fewer or more generator-detector pairs. FIG. 2 illustrates one such generator-detector pair 92 according to various embodiments of the present invention. Various blocks in the FIGS. 1 and 2 represent machine learning systems, such as the generators 101-103 (i.e., Generators 1 through 3) and the detectors 111-113 (i.e., Detectors 1 through 3) in FIG. 1, as well as the generator 212 and the detector 202 in FIG. 2. These machine learning systems and the processes illustrated in FIG. 3 may be implemented on a computer system, such as the computer system 400 illustrated in FIG. 4.

These machine learning systems may be any of a variety of types of machine learning systems, which may each be trained by training techniques specific to the type of machine learning system. For example, if a machine learning system is a neural network, such as the example neural network illustrated in FIG. 5, it may be trained by an iterative process of stochastic gradient with an update to the learned parameters for each minibatch of training data. The computer system 400 may estimate the gradient of the objective function for an individual data item with respect to the learned parameters by a feed-forward computation of the activation of each node in the network, followed by a back-propagation of the partial derivatives of the objective with respect to the learned parameters, that is, the connection weights associated with the arcs and the node biases. The estimated gradients for individual data items may be accumulated by the computer system 400 to estimate the gradient of the objective to update the learned parameters for each minibatch. Stochastic gradient descent and the feed-forward activation computation and back-propagation of partial derivatives are well-known to those skilled in the art of training neural networks. In training of a negative example, such as from block 208 of FIG. 2, the computer system 400 changes the sign of partial derivatives of the objective with respect to the output activations and then back-propagates these reversed partial derivatives by the standard back-propagation process.

Other types of machine learning systems may be trained with other training methods if certain capabilities are available. Two such capabilities are: (1) The training algorithm of each machine learning system must have some mechanism for learning from negative examples; and (2) Each detector must be able to compute an estimate of the partial derivatives of its objective with respect to its inputs so that those partial derivatives can be back propagated to an associated generator. Capability (2) does not require that a detector be trained by back-propagation. For example, capability (2) may be met by numerical estimation of the partial derivative of the objective with respect to each input variable.

Other blocks in FIGS. 1 and 2, such as blocks 104 and 105 in FIG. 1 as well as blocks 207-211 in FIG. 2, represent data of various kinds. These data may be stored in on-board and off-board memory in a computer system, such as the on- and off-board memory of the computer system 400 in FIG. 4.

Figure 3:
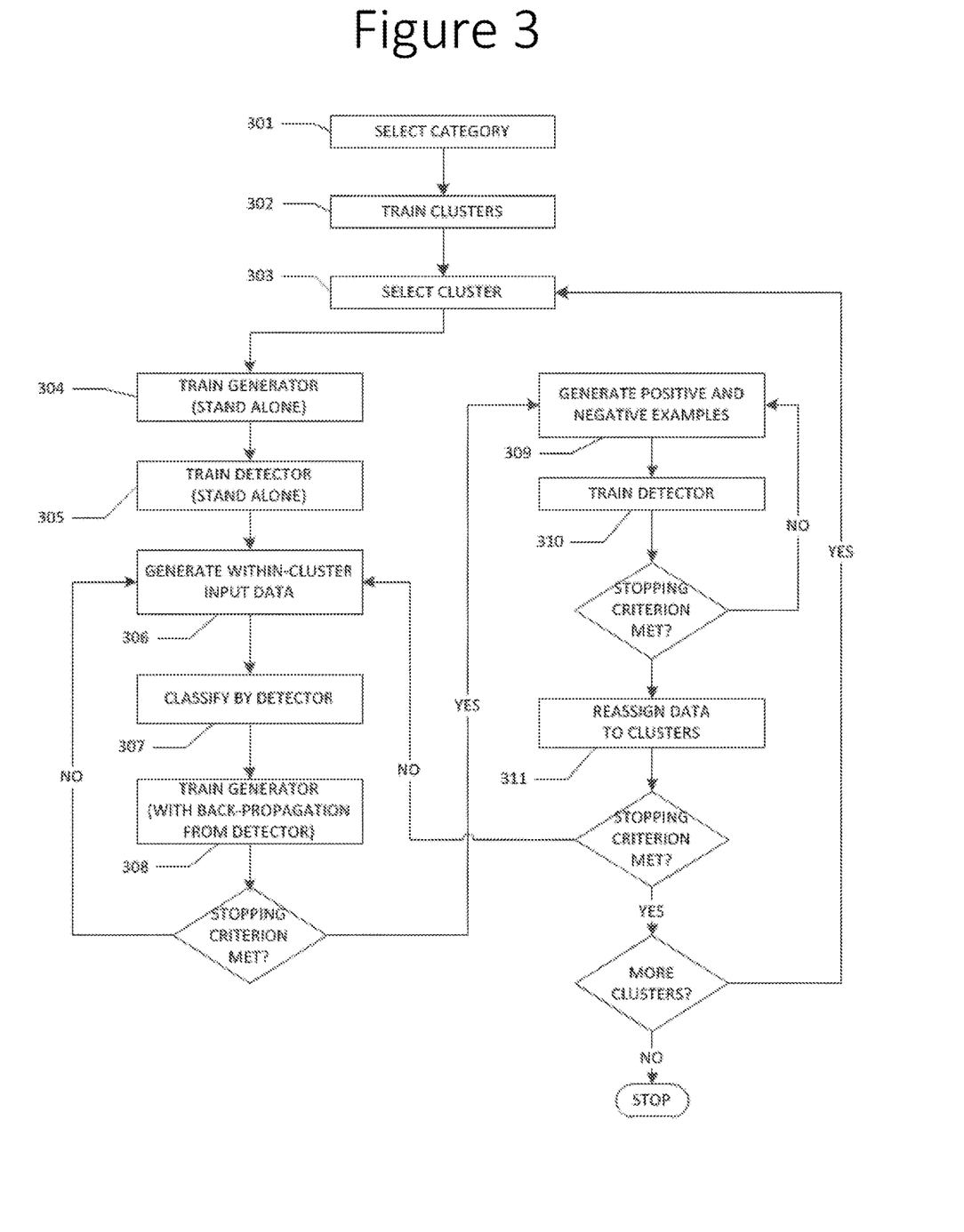
FIG. 3 illustrates a flowchart of a process for a mixture of generators model, such as the system illustrated in FIG. 2, according to one aspect of this disclosure.

FIG. 1 is a block diagram of an illustrative embodiment of a generative model of a category as a mixture of clusters, with each cluster represented by a respective generator-detector pair 92A-C. FIG. 2 illustrates one such generator-detector pair 92 and FIG. 3 is a flow chart of a process for training a generator-detector pair 92. In the illustrated embodiments, each category of input data is modeled as a mixture of clusters, and there is a generator-detector pair for each cluster. As such, the system 90 is called a mixture of generators model (MGM). In FIG. 1 there are only three clusters, all in the same category; hence, only three generator-detector pairs 92A-C are shown, but it is to be understood that there may be any number of clusters/generator-detector pairs per category and any number of categories.

Each generator-detector pair 92A-C may comprise one generator and one detector as shown in FIG. 1, and there preferably is one generator-detector pair 92A-C for each cluster in the category. With reference to FIG. 1, there are assumed to be three cluster and hence three generator-detector pairs, namely: generator 1 (block 101) and detector 1 (block 111) form the generator-detector pair 92A for cluster 1; generator 2 (block 102) and detector 2 (block 112) form the generator-detector pair 92B for cluster 2; and generator 3 (block 103) and detector 3 (block 113) form the generator-detector pair 92C for cluster 3. The generator-detector pairs are trained by the computer system 400 as described in connection with FIGS. 2 and 3. Once trained, the system 90 illustrated in FIG. 1 can be operated by computer system 400 as a generator, as a cluster classifier or as a category classifier. The computer system 400 can also continue training the detectors 111-113 in stand-alone mode, without updating the cluster definitions.

Under control of the computer system 400, a transmission switch 110 (implemented in software) makes different connections among the elements in FIG. 1 depending on the operation being performed by the system 90. During system training, illustrated in FIG. 2, each generator (e.g., the generator 212 in FIG. 2 or the generators 101, 102, or 103, respectively, in FIG. 1) is connected to its corresponding detector (e.g., the detector 202 in FIG. 2 or the detectors 111, 112, or 113, respectively in FIG. 1).

To generate data representing a category, in a node 100, the computer system 400 selects one of the clusters in the category. Each cluster may be selected based on its a priori probability. Using the generator for the selected cluster, say generator 2 for cluster 2, etc., the computer system 400 generates a data example for selected cluster (e.g., cluster 2) that is sent to the transmission switch 110. At the switch 110, the computer system 400 sends the generated data example to block 104 for external use when the system 90 is operated as a generator.

When the system 90 is operating as a classifier, at the switch 110 the computer system 400 can receive real or generated data from block 105. The real or generated data 105 can be stored in an on-board and/or off-board of the computer system 400. If the data 105 is generated data, it may be generated by a data generator (not shown). The switch 110 sends the data from block 105 to each of the detectors 111-113, one for each cluster. As in FIG. 2, in the illustrative embodiment, each of the detectors 111-113 has three possible outputs, representing "Detect," "Reject" and "Neutral," respectively, and represented by the nodes marked D, R and N respectively in FIG. 1.

From each cluster detector 111-113, the computer system 400 preferably feeds the "Detect" activation to two nodes. One destination is "Max Node" 121. The activation of Max Node 121 is the maximum of the activations of the "Detect" outputs of all the clusters in a specific category. For example shown in FIG. 1, the activation value of the max node 121 equals the single greatest activation value for the Detect outputs for Detectors 1 through 3. The activation of node 121 may be used as the score for the category in a category classification task. The node 121 preferably receives back propagation during training for the classification task and in turn the computer system 400 back propagates the error cost function derivatives to the detector 111-113 that has the maximum value.

The second destination, in the cluster classification mode, is a dedicated node in the node set 131. There is one node in the node set 131 for each detector 111-113, and hence has one node for each cluster in the specified category. The computer system 400 sends the "Detect" activation of each cluster detector 111-113 to its respective, dedicated node in the node set 131. In the illustrative embodiment, the computer system 400 performs a softmax operation for the node set 131; that is, it normalizes the activations of its nodes to sum to one. During training, the node set 131 is trained by the computer system 400 for cluster classification. For each data example, the target for the node set 131 is a value of one for the correct cluster and a value of zero for all the other nodes. In the node set 131, the computer system 400 back propagates this objective to the cluster detectors 111, 112 and 113, respectively.

Thus, under control of the computer system 400, there are three modes of operation for transmission switch 110: (1) training, (2) generation, and (3) classification. In addition, there are two sub-modes for classification: (1) category classification and (2) cluster classification, which are controlled by the computer system 400 selecting either the node set 131 or the node 121, respectively, as the output of the system.

This continued training refines the ability of the detectors 111-113 to classify the cluster as defined and continues to train the category classification. In an illustrative embodiment, the cluster definitions are also updated by returning to the process of paired generator detector training illustrated in FIG. 2.

FIGS. 2 and 3 represent an illustrative embodiment of a system and method for pairing a generator with a detector that is useful in various embodiments of this invention. The illustrated method is used in the illustrative embodiment of FIG. 1 to build the mixture of generators model (MGM). FIG. 2 is a block diagram of an illustrative embodiment, and FIG. 3 is a flow chart of an illustrative example of training the generator-detector pair shown in FIG. 2. In the illustrative embodiment of FIG. 2, the generator-detector pair comprises the generator 212 and a detector 202. The detector 202 and the generator 212 are trained by the computer system 400 to detect and generate data related to a single cluster. The cluster may have been trained by unsupervised learning on unlabeled data, or the cluster may be a cluster within a single category of labeled data.

Block 201 in FIG. 2 represents the input to the detector 202. The detector 202 has three possible outputs. Output 203 represents a detection event. Activation of this output represents detection. For example, the range of activation values may be 0 to 1, with activations greater than some threshold, say 0.5, representing detection and activations less than that threshold representing lack of detection, if output 203 were the only output node and had a sigmoid activation function. A conventional detector only needs one output, which would be equivalent to output 203. This illustrative embodiment, however, represents additional information about the non-detections (e.g., reject or neutral) and uses that information in its training process. Output 204 represents detection of a negative example, and output 205 represents a neutral non-detection. Each of the three options, detect, reject, or neutral is trained by supervised training from examples of the three types of events, as explained in association with blocks 207, 208, 209, and 210 of FIG. 2. In some embodiments, each of the three output nodes is trained separately; for example, they may each be trained with a sigmoid activation function. In some embodiments, the three nodes are grouped together with a softmax computation applied to their activations. Training with sigmoid activations or softmax activations for output nodes are well-known to those skilled in the art of training neural networks. In either case, the activation of each output node is in the range [0,1]. With the softmax activation, the activations of the three nodes are constrained to sum to 1.0. The output is said to designate a detection, a rejection, or a neutral output according to which of the three nodes has the maximum activation. The use of a softmax normalization does not change the identity of which output node has maximum score. With sigmoid outputs, the maximum activation may be any number in the range [0,1]. With a softmax normalization, the maximum score must be at least ⅓. Moreover, there may be differences in the training such that one representation may be preferred in some embodiments and the other representation may be preferred in other embodiments.

Block 201 receives its input from any of several sources. It can receive within-cluster data from block 209. When there is labeled data, it can receive data that is from the same category as the cluster, but that is not in the cluster, from block 210. And it can receive general background data, that is, data not from the category, from block 207. When data from block 207 is misclassified as a detection by the detector 202, the computer system 400 causes the misclassified data example from the block 207 to be copied to block 208, which stores the background examples that are misclassified as negative examples. Data that has been copied to block 208 can be used in continued training of the detector 202 as an example for which the target output of the detector 202 is 204 "Reject." The target output for within-cluster input data from block 209 is "Detect." The target output for within-category input data from block 210 is "Neutral," but in various embodiments classification of input data from block 210 as a detection does not cause the example to be copied by the computer system 400 to block 208 as a negative example.

The target output of the detector 202 for background data from block 207 is also "Neutral." As mentioned above, misclassification of this data as a detection causes the misclassified data example to be copied by the computer system 400 to block 208 as a negative example. However, if background data is classified as "Reject," that classification is accepted. In some embodiments, when background data is classified as "Reject," no back propagation is done from the nominal target of "Neutral."

Block 201 can also receive input from the generator 212. In some phases of training for some embodiments, in the detector 202 the computer system 400 also back propagates partial derivatives as part of the training of the generator 212. The generator 212 may be any form of generator. In some embodiments, it is a stochastic autoencoder, for example a variational autoencoder (VAE), receiving its input from block 211. Use of a VAE as a generator is well-known to those skilled in the art of neural networks. Although the illustrative embodiment shown in FIG. 2 uses a stochastic autoencoder as generator 212, with an encoder and decoder, it is to be understood that some other form of generator may be used. When generator 212 is an autoencoder or another form of generator that can be trained on designated training data, preferably it is initially trained just on data from the cluster. In some embodiments, when there is too little data in the cluster, the generator 212 may as also be trained on other data from the category. As a generator, once it has been trained, it may be constrained to only use latent variables corresponding to data from the cluster. As will be seen in FIG. 3, in some embodiments, subsequent training of the generator 212 may include both positive and negative examples.

Although FIG. 2 only shows one detector 202 and one generator 212, in some embodiments a plurality of generators may be paired with a single detector 202; or a plurality of detectors 202 may be paired with a single generator 212. In embodiments where there are multiple generators, the generators may be all of the same type or of more than one type. In the paired training, if the generator 212 is an autoencoder, it has multiple objectives; the input data as a target 211; back propagation from the detector 202; and possibly additional objectives 214.

FIG. 3 depicts a flowchart of an illustrative embodiment of the paired training process. In block 301, the computer system 400 selects a category. In block 302, the computer system 400 trains clusters within the category. Any clustering algorithm known in the field can be used in block 302. As illustrative examples, the clustering can be done as K-means clustering or Expectation-Maximization clustering for a Gaussian Mixture Model. The clusters trained in block 302 may later be modified by the computer system 400 in block 311. In block 303, the computer system 400 selects one of the clusters trained at step 302 so that the generator-detector pair 92 for the selected cluster can be trained through steps 304 to 311, as described below. If there are multiple clusters, and hence multiple corresponding generator-detector pairs 92, steps 304-311 can be completed for each such cluster/generator-detector pair.

In block 304, the computer system 400 trains the generator 212 of FIG. 2, with the training examples for the selected cluster, on a stand-alone basis. That is, the generator 212 is trained without back propagation from the corresponding detector 202 of FIG. 2. Further training of the generator 212 will be done in block 308. In block 305, the computer system 400 trains the detector 202 of FIG. 2 on a stand-alone basis with the real training examples for the selected cluster. In some embodiments, in training the detector 202 in block 305, the computer system 400 may also use data examples generated by the generator 212 as initially trained in block 304. In block 306, the computer system 400 uses the generator 212 of FIG. 2 to generate data that represents data from the selected cluster (i.e., "within-cluster" data). That is, the vector of latent variables that is used is the latent vector for a data example from the cluster. In block 307, the computer system 400 classifies the data generated by the generator 212 at step 306 using the detector 202 of FIG. 2 trained at step 305. In block 308, the computer system 400 trains the generator 212, which training includes back propagation from detector 202. The process loops back and repeats blocks 306, 307 and 308 until a stopping criterion is met. As illustrative examples, a stopping criterion may be (i)

convergence, (ii) a specified limit on number of iterations, or (iii) early stopping because of degradation on validation data.

If the stopping criterion is met, the process advances to block 309, where the computer system 400 uses the generator 212 with latent variables both from the cluster and from other clusters to generate within-cluster (positive) and out-of-cluster (negative) data. Then, in block 310, the computer system 400 trains the detector 202 on the data generated by the generator 212 in block 309. The process then loops back to get more training data from block 309 until a stopping criterion for training the detector 202 is met. As illustrative examples, a stopping criterion for training the detector at step 310 may be (i) convergence, (ii) a specified limit on number of iterations, or (iii) early stopping because of degradation on validation data.

Once the stopping criterion for training the detector 202 is met, the process advances to block 311, where computer system 400 uses the updated detector 202 to classify the data from the category and to re-assign data into or out of the cluster. Then it returns control to block 306 to generating mode within-cluster data until a stopping criterion is met. As illustrative examples, the stopping criterion may be (i) convergence, (ii) a specified limit on number of iterations, or (iii) early stopping because of degradation on validation data. Once the stopping criterion is met, the process may be repeated, one at a time, for any additional clusters that were trained at step 302 in order to generate the generator-detector pair for those additional clusters.

Although the illustrative embodiments have primarily been described with neural networks as generators and specifically with a VAE as an example of generator 212, it is to be understood that other types of generators may be used. For example, a different type of stochastic autoencoder, called a "stochastic categorical autoencoder (SCAN)," may be used. A SCAN has the same form as a VAE but uses a different objective and imposes different constraints on the parameters of the parametric probability distribution of the stochastic layer in the autoencoder. SCANs are described in more detail in U.S. patent application Ser. No. 16/124,977, filed Sep. 7, 2018, entitled "Stochastic Categorical Autoencoder Network," which is hereby incorporated by reference in its entirety.

As another example, a generative adversarial network (GAN) may be used. A GAN uses a stochastic layer and a decoder network such as the generator 212 in FIG. 2, but with no encoder. In training a GAN an adversarial classifier is also trained, although that is not shown in FIG. 2. The adversarial classifier attempts to discriminate between real data and synthetic data that are produced by the GAN generator. The GAN generator is trained with the objective of fooling the adversarial classifier. In the systems illustrated in FIGS. 1 and 2, a GAN generator, in addition to the objective of fooling its associated adversarial classifier, would preferably also have, in various embodiments of the invention, the objectives of the VAEs other than the autoencoder objective of having its output match its input. A GAN does not have an encoder, so the input to its decoder is directly related to a stochastic layer without being related to an encoded input data example.

In some embodiments, the mixture of generators may include generators of a plurality of different types (e.g., VAE, SCAN, GAN). In such embodiments, if a generator is not capable of being trained to generate data items only representing a specific cluster or category, then in the embodiment illustrated in FIG. 2 that generator may be paired with another generator that is capable of being trained to generate data items representing a specific cluster or category in order to generate the data examples required in blocks 306 and 309 of FIG. 3.

Other types of generators may be used within the scope and spirit of the invention.

Figure 4:
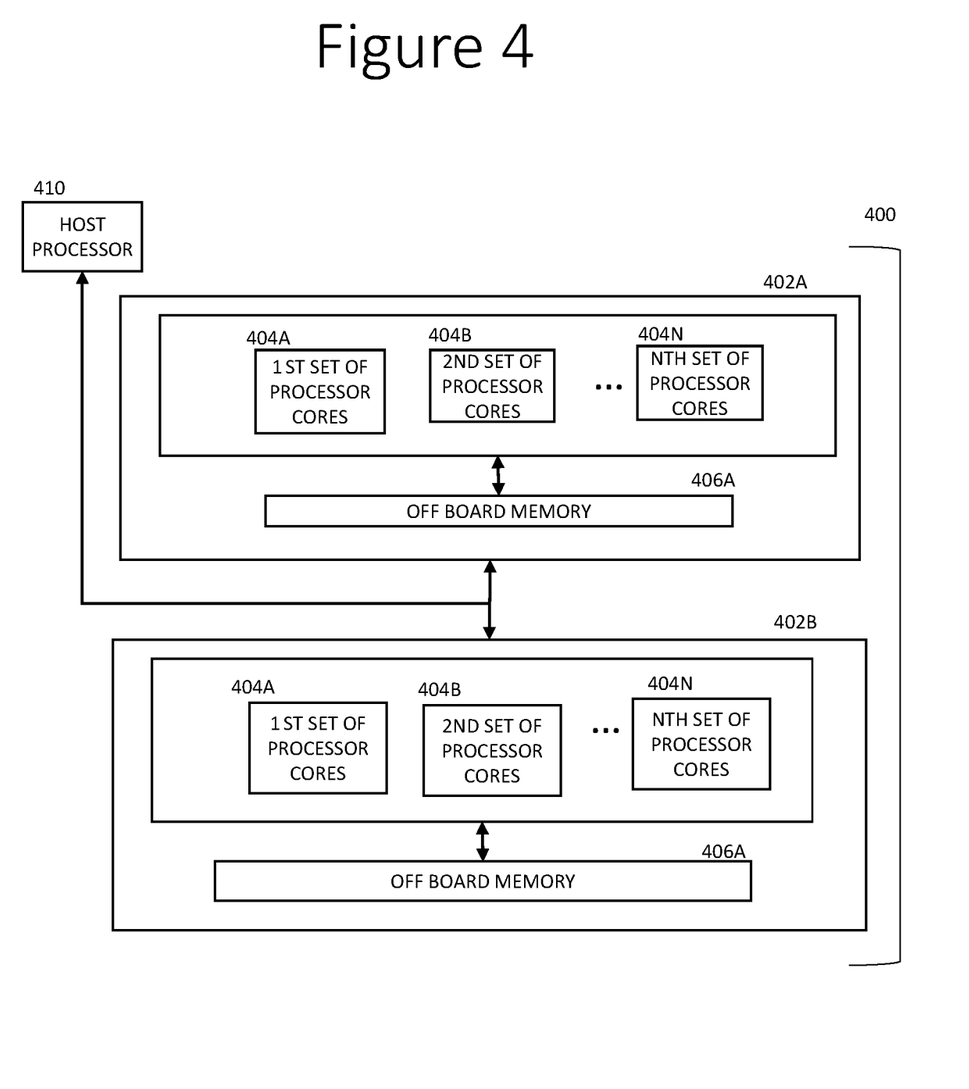
FIG. 4 is a diagram of a computer system that may be used to implement various embodiments.

FIG. 4 is a diagram of a computer system 400 that could be used to implement the embodiments described above. The illustrated computer system 400 comprises multiple processor units 402A-B that each comprises, in the illustrated embodiment, multiple (N) sets of processor cores 404A-N. Each processor unit 402A-B may comprise on-board memory (ROM or RAM) (not shown) and off-board memory 406A-B. The on-board memory may comprise primary, volatile and/or non-volatile storage (e.g., storage directly accessible by the processor cores 404A-N). The off-board memory 406A-B may comprise secondary, non-volatile storage (e.g., storage that is not directly accessible by the processor cores 404A-N), such as ROM, HDDs, SSD, flash, etc. The processor cores 404A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 410 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 404 may train and/or implement different networks or subnetworks or components. For example, in one embodiment, the cores of the first processor unit 402A may implement the generators 101-103 in FIG. 1 and the second processor unit 402B may implement the detectors 111-113 in FIG. 1. Further, different sets of cores in the first processor unit 402A may be responsible, respectively, for each generator 101-103 and different sets of cores in the second processor unit 402B may be responsible, respectively, for each detector 111-113. One or more host processors 410 may coordinate and control the processor units 402A-B.

In other embodiments, the system 400 could be implemented with one processor unit 402. In embodiments where there are multiple processor units, the processor units could be co-located or distributed. For example, the processor units 402 may be interconnected by data networks, such as a LAN, WAN, the Internet, etc., using suitable wired and/or wireless data communication links. Data may be shared between the various processing units 402 using suitable data links, such as data buses (preferably high-speed data buses) or network links (e.g., Ethernet).

The software for the various computer system 400s described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

Figure 5:
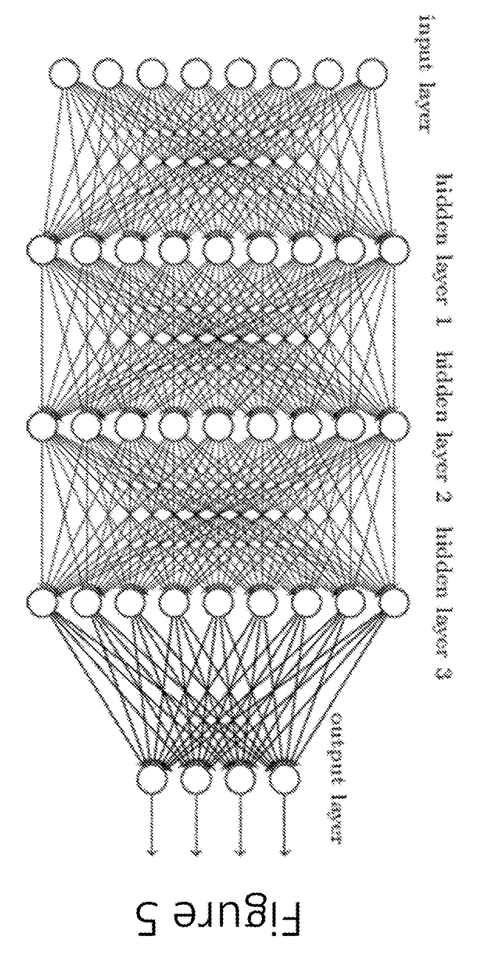
FIG. 5 is a diagram illustrating a deep neural network of the type that might be used in various aspects of various embodiments of the invention.

FIG. 5 is a drawing of an example of a multi-layer feed-forward deep neural network. Many components of the current invention may comprise neural networks, such as the example neural network shown in FIG. 4. A neural network is a collection of nodes and directed arcs. The nodes in a neural network are often organized into layers. In a feed-forward neural network, the layers may be numbered from bottom to top, when diagramed as in FIG. 5. Each directed arc in a layered feed-forward neural network goes from a source node in a lower layer to a destination node in a higher layer. The feed-forward neural network shown in FIG. 5 has an input layer, an output layer, and three inner layers. An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. During training, the values of the learned parameters are adjusted by the computer system 400 shown in FIG. 4. Other parameters that control the training process are called hyperparameters.

A feed-forward neural network may be trained by the computer system 400 using an iterative process of stochastic gradient descent with one iterative update of the learned parameters for each minibatch. The full batch of training data is typically arranged into a set of smaller, disjoint sets called minibatches. An epoch comprises the computer system 400 doing a stochastic gradient descent update for each minibatch contained in the full batch of training data. For each minibatch, the computer estimates the gradient of the objective for a training data item by first computing the activation of each node in the network using a feed-forward activation computation. The computer system 400 then estimates the partial derivatives of the objective with respect to the learned parameters using a process called "back-propagation," which computes the partial derivatives based on the chain rule of calculus, proceeding backwards through the layers of the network. The processes of stochastic gradient descent, feed-forward computation, and back-propagation are well-known to those skilled in the art of training neural networks.

Based on the above description, it is clear that embodiments of the systems described above, with its generator-detector pairs, can operate as a generator, as a cluster classifier or as a category classifier, for example. As a generator, the generator-detector pairs can be used to generate synthetic data, such as image data or other types of data, for training other machine learning networks or for other beneficial purposes. As a cluster or category classifier, it can be used to classify data items into clusters or categories, which can be useful in a wide variety of applications, including image and diagnostic classification systems, to name but a few examples.

In one general aspect, therefore, the present invention is directed to computer systems and computer-implemented methods for training and/or operating, once trained, a machine-learning system that comprises a plurality of generator-detector pairs. The machine-learning computer system comprises a set of processor cores and computer memory that stores software. When executed by the set of processor cores, the software causes the set of processor cores to implement a plurality of generator-detector pairs, in which: (i) each generator-detector pair comprises a machine-learning data generator and a machine-learning data detector; and (ii) each generator-detector pair is for a corresponding cluster of data examples respectively, such that, for each generator-detector pair, the generator is for generating data examples in the corresponding cluster and the detector is for detecting whether data examples are within the corresponding cluster.

In various implementations, each generator-detector pair may be trained by performing steps that comprise, with a plurality of data examples in the cluster corresponding to the generator-detector pair, initially training the generator without back-propagation from the detector. After initially training the generator, the method comprises: generating, by the generator, within-cluster input data examples that are within the cluster corresponding to the generator-detector pair; classifying, by the detector, the within-cluster input data examples generated by the generator; and secondarily training the generator with back-propagation from the detector. Finally, after training the generator with back-propagation from the detector, the method comprises the step of training the detector with within-cluster data examples and out-of-cluster data examples.

In various implementations, the plurality of generator-detector pairs, collectively, once-trained, are operable as a generator, as a cluster classifier, and as a category classifier. When operated as a generator, a generator of the plurality of generator-detector pairs can output generated data examples corresponding to the cluster for the generator. When operated as a cluster classifier, the machine-learning system can determine that a proper cluster for an input data example is the cluster corresponding to the detector of the plurality of generator-detector pairs with the with the greatest activation level for a detection. When operated as a category classifier, an output of the machine-learning system can correspond to a maximum activation level for a detection among the detectors of the plurality of generator-detector pairs.

In addition, the each generator of the plurality of generator-detector pairs may comprise a generator type selected from the group consisting of an autoencoder, a variational autoencoder (VAE), a stochastic categorical autoencoder network (SCAN), and a generative adversarial network (GAN). Also, each generator and/or detector in the generator-detector pairs may comprise a neural network. Further, each of the generators and/or the detectors may be trained by stochastic gradient descent.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A machine-learning computer system for training a category classifier, wherein the category is modeled as having a plurality of clusters, including at least a first cluster and a second cluster, the machine-learning computer system comprising:
- a set of processor cores: and
- computer memory that stores software that, when executed by the set of processor cores, causes the set of processor cores to train, through machine learning, a plurality of generator-detector pairs, wherein:
  - the plurality of generator-detector pairs comprise at least a first generator-detector pair and a second generator-detector pair;
  - each of the plurality of generator-detector pairs comprises a generator and a detector, such that:
    - the first generator-detector pair comprises a first generator and a first detector; and
    - the second generator-detector pair comprises a second generator and a second detector;
  - each generator of each generator-detector pair comprises a decoder, wherein the decoder comprises a neural network, and such that:
    - the first generator comprises a first decoder; and
    - the second generator comprises a second decoder;
  - the detector of each generator-detector pair comprises a neural network that is different from the neural network of the decoder of the generator of the generator-detector pair;
  - each generator of the plurality of generator-detector pairs is trained, through machine learning, to generate generated data examples, respectively, in the plurality of clusters of the category, such that:
    - the first generator is trained, through machine learning, to generate generated data examples in the first cluster; and
    - the second generator is trained, through machine learning, to generate generated data examples in the second cluster;
  - each detector of the plurality of generator-detector pairs is trained, through machine learning, to determine, respectively, whether input data items to the detector are in one of the plurality of clusters of the category, such that:
    - the first detector is trained, through machine learning, to determine whether input data items to the first detector are in the first cluster of the category;
    - the second detector is trained, through machine learning, to determine whether input data items to the second detector are in the second cluster of the category; and
  - each detector is trained with, at least, the generated data examples generated by the generator of the generator-detector pair, such that:
    - the first detector is trained, at least partially, with the generated data examples from the first generator; and
    - the second detector is trained, at least partially, with the generated data examples from the second generator;
  - outputs of the generators of the generator-detector pairs are connected to inputs of the corresponding detector of the generator detector pairs, such that;
    - an output of the first decoder of the first generator of the first generator-detector pair is connected to an input of the first detector of the first generator-detector pair; and
    - an output of the second decoder of the second generator of the second generator-detector pair is connected to an input of the second detector of the second generator-detector pair; and
  - training the plurality of generator-detector pairs comprises, for each of the generator-detector pairs, back-propagating partial derivatives from the detector of the generator-detector pair to the generator of the generator-detector pair, such that:
    - partial derivatives of an error cost function for the first detector are back-propagated from the first detector to the first generator; and
    - partial derivatives of an error cost function for the second detector are back-propagated from the second detector to the second generator.

2. The machine-learning computer system of claim 1, wherein, collectively, outputs of the plurality of generator-detector pairs, after training, are operable the category classifier.

3. The machine-learning computer system of claim 2, wherein:
- an output of the first generator, after training, is operable as a generator for the first cluster; and
- an output of the second generator, after training, is operable as a generator for the second cluster.

4. The machine-learning computer system of claim 2, wherein:
- an output of the first detector, after training, is operable as a cluster classifier for the first cluster; and
- an output of the second detector, after training, is operable as a cluster classifier for the second classifier.

5. The machine-learning computer system of claim 2, wherein, when operated as the category classifier, an output of the machine-learning system corresponds to a maximum activation level for a detection among the detectors of the plurality of generator-detector pairs.

6. The machine-learning computer system of claim 1, wherein each generator of the plurality of generator-detector pairs comprises a generator type selected from the group consisting of an autoencoder, a variational autoencoder, a stochastic categorical autoencoder network, and a generative adversarial network.

7. The machine-learning computer system of claim 1, wherein each of the generators and each of the detectors are trained by stochastic gradient descent.

8. The machine-learning computer system of claim 1, wherein each generator comprises an encoder.

9. A computer-implemented method for training a category classifier, wherein the category is modeled as having a plurality of clusters, including at least a first cluster and a second cluster, the method comprising:
- training, by a computer system that comprises a set of processor cores, through machine learning, a plurality of generator-detector pairs of a machine-learning system such that:
  - the plurality of generator-detector pairs comprises at least a first generator-detector pair and a second generator-detector pair;
  - each generator-detector pair comprises a generator and a detector, such that;
    - the first generator-detector pair comprises a first generator and a first detector; and
    - the second generator-detector pair comprises a second generator and a second detector;
  - the generator of each generator-detector pair comprises a decoder, wherein each decoder comprises a neural network, and such that:
    - the first generator comprises a first decoder; and
    - the second generator comprises a second decoder;

the detector of each generator-detector pair comprises a neural network that is different from the neural network of the decoder of the generator of the generator-detector pair;

each generator of the plurality of generator-detector pairs is trained, through machine learning, to generate generated data examples, respectively, in the plurality of clusters of the category, such that:
- the first generator is trained, through machine learning, to generate generated data examples in the first cluster; and
- the second generator is trained, through machine learning, to generate generated data examples in the second cluster;

each detector of the plurality of generator-detector pairs is trained, through machine learning, to determine, respectively, whether input data items to the detector are in one of the plurality of clusters of the category, such that:
- the first detector is trained, through machine learning, to determine whether input data items to the first detector are in the first cluster of the category;
- the second detector is trained, through machine learning, to determine whether input data items to the second detector are in the second cluster of the category; and each detector is trained with, at least, the generated data examples generated by the generator of the generator-detector pair, such that:
- the first detector is trained, at least partially, with the generated data examples from the first generator; and
- the second detector is trained, at least partially, with the generated data examples from the second generator;

an output of the decoder of each generator-detector pair is connected to an input of the detector of the generator-detector pair, such that:
- an output of the first decoder of the first generator of the first generator-detector pair is connected to an input of the first detector of the first generator-detector pair; and
- an output of the second decoder of the second generator of the second generator-detector pair is connected to an input of the second detector of the second generator-detector pair; and training the plurality of generator-detector pairs comprises, for each of the generator-detector pairs, back-propagating partial derivatives from the detector of the generator-detector pair to the generator of the generator-detector pair, such that:
- partial derivatives of an error cost function for the first detector are back-propagated from the first detector to the first generator; and
- partial derivatives of an error cost function for the second detector are back-propagated from the second detector to the second generator.

10. The method of claim 9, wherein training the plurality of generator-detector pairs comprises, for each of the plurality of generator-detector pairs:
- with a plurality of data examples in the cluster corresponding to the generator-detector pair, initially training the generator without back-propagation from the corresponding detector of the generator-detector pair;
- after initially training the generator:
  - generating, by the generator, within-cluster generated data examples that are within the cluster corresponding to the generator-detector pair;
  - classifying, by the detector, the within-cluster generated data examples generated by the generator; and
  - secondarily training the generator with back-propagation from the detector;
- after training the generator with back-propagation from the detector, training the detector with within-cluster data examples and out-of-cluster data examples.

11. The method of claim 10, wherein training the plurality of generator-detector pairs comprises training the plurality of generator-detector pairs such that the machine learning system is operable, after training, as a generator, as a cluster classifier, and as the category classifier, wherein:
- when operated as a generator, a generator of the plurality of generator-detector pairs outputs generated data examples corresponding to the cluster for the generator;
- when operated as a cluster classifier, the machine-learning system determines that a proper cluster for an input data example is the cluster corresponding to the detector of the plurality of generator-detector pairs with the with the greatest activation level for a detection; and
- when operated as the category classifier, an output of the machine-learning system corresponds to a maximum activation level for a detection among the detectors of the plurality of generator-detector pairs.

12. The method of claim 10, wherein each generator of the plurality of generator-detector pairs comprises a generator type selected from the group consisting of an autoencoder, a variational autoencoder, a stochastic categorical autoencoder network, and a generative adversarial network.

13. The method of claim 9, wherein secondarily training the generator comprises secondarily training the generator by stochastic gradient descent.

14. The method of claim 11, wherein each generator of the plurality of generator-detector pairs comprises a generator type selected from the group consisting of an autoencoder, a variational autoencoder, a stochastic categorical autoencoder network, and a generative adversarial network.

15. The method of claim 9, wherein training the plurality of generator-detector pairs comprises training the first detector of the first generator-detector pair with negative examples of the first cluster.

16. The method of claim 15, wherein the negative examples of the first cluster comprise generated data examples from the second generator.

* * * * *